2,953,430

METHOD OF PREPARATION OF URANIUM DIOXIDE

William M. Leaders, Webster Groves, Donald E. Rhodes and Carl W. Kuhlman, Jr., St. Louis, and Gerard C. Hemkens, Overland, Mo., assignors to Mallinckrodt Chemical Works, St. Louis, Mo., a corporation of Missouri No Drawing. Filed Mar. 11, 1957, Ser. No. 644,968

10 Claims. (Cl. 23—14.5)

This invention relates to a method of preparing uranium dioxide and more particularly, to a novel method of preparing substantially fluoride-free uranium dioxide.

Briefly, the present invention is directed to a method of preparing substantially fluoride-free uranium dioxide which comprises thermally decomposing fluoride-containing ammonium diuranate at a temperature above 400° C. in a current from an external source containing hydrogen and a significant amount of steam until the ammonium diuranate is converted to substantially fluoride-free black oxide of the formula $U_3O_8$, and thereafter heating said black oxide in an atmosphere of hydrogen until it is reduced to substantially fluoride-free uranium dioxide.

Among the several objects of the invention may be mentioned the provision of a novel method for preparing substantially fluoride-free uranium dioxide directly from fluoride-containing ammonium diuranate; the provision of such a method which produces substantially fluoride-free uranium dioxide suitable for use as a nuclear fuel; the provision of a method of the type described which can be carried out in a simple and convenient manner without prior chemical or other special purification of the ammonium diuranate; and the provision of such a method which can be carried out in readily procurable equipment without appreciable corrosion thereof or contamination of the final product resulting therefrom. Other objects will be in part apparent and in part pointed out hereinafter.

The invention accordingly comprises the methods hereinafter described, the scope of the invention being indicated in the following claims.

For use as a nuclear fuel, uranium which has been enriched with respect to $U_{235}$ is commonly used in the form of its dioxide. The usual source of enriched uranium for such purposes is enriched uranium hexafluoride which is readily converted to ammonium diuranate with aqueous ammonia. In theory, the conversion of ammonium diuranate to black oxide, $U_3O_8$, by thermal decomposition and then to uranium dioxide by reduction with hydrogen is simple and straightforward. In practice, however, serious difficulty is encountered because the ammonium diuranate obtained from uranium hexafluoride, even after thorough washing, always contains 2-3 percent fluoride and stubbornly resists purification. This fluoride appears to be present in the form of a stable complex. Unless it is removed, it causes serious corrosion during the thermal decomposition and reduction steps and, moreover, a substantial part of it persists in the final product.

To be suitable for use as a nuclear fuel, uranium dioxide must be substantially fluoride-free. For some purposes it is satisfactory if it contains less than 200 p.p.m. fluoride, but for certain purposes the fluoride content must be less than 100 p.p.m.

Because of the aforementioned difficulties the conversion of uranium hexafluoride to uranium dioxide by way of ammonium diuranate has heretofore been considered impractical.

In accordance with the present invention, it has now been found that substantially fluoride-free uranium dioxide can be obtained directly from fluoride-containing ammonium diuranate, such as that obtained by treating uranium hexafluoride with aqueous ammonia, in a simple and convenient manner without prior chemical or other special purification of the ammonium diuranate. Uranium dioxide containing less than 100 p.p.m. fluoride is easily obtained even when the filter cake from the reaction between uranium hexafluoride and aqueous ammonia is not given a prior washing to remove the adhering mother liquor which contains a large amount of ammonium fluoride. Moreover, the process can be carried out in simple readily procurable equipment without appreciable corrosion of the reactor and the contamination of the final product resulting therefrom.

The objectives of this invention are accomplished by thermally decomposing fluoride-containing ammonium diuranate at a temperature above 400° C. in a current from an external source containing hydrogen and a significant amount of steam until it is converted to substantially fluoride-free black oxide, $U_3O_8$; and then continuing to heat the black oxide in an atmosphere of hydrogen alone until it is reduced to uranium dioxide. The process may be carried out in a closed reactor constructed of a nickel alloy, such as Inconel and the like, the reactor being heated by a suitable furnace and equipped with fittings for the introduction of steam and hydrogen and the removal of exit gases.

The complex fluoride impurity in the ammonium diuranate is freed and volatilized during the thermal decomposition along with any ammonium fluoride that was present, and swept out of the reactor along with the other exit gases. While hydrogen is not necessary for the removal of fluorides, its presence during the thermal decomposition has been found essential to reduce corrosion of the reactor and to produce a product suitable for use as a nuclear fuel. In the absence of hydrogen, there is some oxidation of the nickel alloy and the oxides thus formed contaminate the product with undesirable metallic elements. Only a small amount of hydrogen is required, and a mixture of one part of hydrogen to 10 parts of steam has been found adequate.

While hydrogen may be supplied as such to the reactor, it is more economical and convenient to supply it in the form of gaseous ammonia. In the presence of uranium and under the conditions of this process, ammonia is quickly decomposed to form hydrogen and nitrogen. It will be understood, therefore, that for the purposes of this invention hydrogen, gaseous ammonia, and the mixture of hydrogen and nitrogen resulting from its thermal decomposition are equivalents.

In operating the process of this invention, continuous addition of the hydrogen and steam to the reactor is preferred so as to maintain a slow current of gas through the reactor and thereby sweep the thermal decomposition products out of the reactor. While an excess of both steam and hydrogen is required, the exact quantity used is not critical. Approximately a five-fold excess of steam over the stoichiometric requirement has been found to give good results.

The reduction of black oxide of the formula, $U_3O_8$, to uranium dioxide is preferably but not necessarily carried out at the same temperature as the thermal decomposition. Instead of carrying out both the thermal decomposition and reduction consecutively in the same reactor, a separate reactor constructed of a corrosion resistant alloy such as stainless steel and the like which is not resistant to hydrogen fluoride may be used for the reduction since fluorides are removed during the thermal decomposition.

Operating temperatures as low as 400° C. and as high as the reactor and furnace will permit, may be used but a temperature of about 850° C. is preferred. At this temperature the thermal decomposition is, for example, usually completed within 3 hours and the reduction within 2 hours. Somewhat longer or shorter reaction times may be desirable under certain conditions depending upon the size of the reactor, disposition of the material in the reactor, and other operating conditions. If lower temperatures are employed the reaction times must be increased and the amount of other metallic elements in the final product is increased.

It normally would be considered desirable to wash the freshly prepared ammonium diuranate thoroughly to remove as much as possible of the ammonium-fluoride containing mother liquor. For use in the present invention, however, it is sometimes advantageous to omit the washing step. Uranium dioxide prepared from unwashed ammonium diuranate, i.e., a product still containing some ammonium fluoride in addition to the fluoride complex which cannot be removed by washing, is much denser and more desirable for making certain nuclear fuel elements than is uranium dioxide made from thoroughly washed amminoum diuranate.

It will be apparent that many variations may be made in the invention as described herein. While the specific reaction conditions cited by way of example are those which have been found to be desirable when the final product is to be used for making nuclear fuel elements, the invention is not limited to this particular application. For other applications certain features of the invention, i.e., purity of the product with respect to other metallic elements, may be relatively unimportant and somewhat different operating conditions would be feasible and perhaps advantageous.

The following examples illustrate the invention.

*Example 1*

A solution corresponding to $UO_2F_2+4HF$ and containing 25 g. of uranium per liter of solution was placed in a 13 gallon polyethylene carboy equipped with a polyethylene stirrer. An atmosphere of ammonia was then maintained above the stirred solution until the precipitation of ammonium diuranate was complete. The precipitated ammonium diuranate was separated from the mother liquor by filtration using a Buechner funnel. Unless otherwise noted in the following examples, the precipitate was also washed with water before it was used for the preparation of uranium dioxide. After washing, the fluoride content was 2–3%.

*Example 2*

For the thermal decomposition a reactor box was constructed of 1/8" sheets of Inconel welded together having outside dimensions of 6¾" wide, 4¾" high and 14¼" deep. This box was welded to a flange (½" thick and 1½" wide) on each side. Sixteen ⅜" holes ½" from the edge of the flange and equally spaced were used to bolt on the front plate. A shelf was provided inside the box so that two levels of trays could be placed in the reactor. The front plate, ½" thick, contained thermowells, and an inlet and outlet of ⅜" pipe for gas flow. An asbestos gasket was used on the flange.

The trays were constructed of 1/16" sheet Inconel. The two sizes were 3" wide by 6" long by 1" deep and 6" wide by 9" long by 1" deep.

In use the reactor box was placed inside a suitable electric furnace the temperature of which could be regulated by controlling the voltage of the current in the heating elements.

Using the above apparatus ammonium diuranate containing 2–3% fluoride was thermally decomposed to black oxide ($U_3O_8$) at 750° C. for 4 hours in an atmosphere of steam and hydrogen. The resulting black oxide was then reduced to brown uranium dioxide in an atmosphere of hydrogen at 900° C. for 4 hours in a stainless steel reactor. It was found that 97% of the uranium had been reduced to uranium dioxide. The resulting product contained 100 p.p.m. fluoride.

*Example 3*

Ammonium diuranate containing 2–3% fluoride was thermally decomposed in an atmosphere of steam and hydrogen to black oxide ($U_3O_8$) at 800° C. for 4 hours, and the resulting black oxide was reduced to uranium dioxide by heating in an atmosphere of hydrogen at 900° C. for 4 hours. It was found that 96% of the uranium had been reduced to uranium dioxide. The resulting product contained less than 100 p.p.m. fluoride.

*Example 4*

Example 3 was repeated except that the black oxide was reduced to brown uranium dioxide by first heating at 900° C. for 4 hours in an atmosphere of hydrogen and thereafter continuing the heating in an atmosphere of hydrogen for 6 additional hours at 950° C. to obtain uranium dioxide. It was found that 92% of the uranium had been reduced to uranium dioxide. The resulting product contained less than 100 p.p.m. fluoride.

*Example 5*

Ammonium diuranate containing 2–3% fluoride was thermally decomposed and reduced to brown uranium dioxide in one step using an Inconel reactor. The material was first heated to 850° C. in an atmosphere of steam alone. Heating was then continued for 3 hours in an atmosphere of steam and hydrogen and finally for 2 hours in an atmosphere of hydrogen alone to obtain uranium dioxide. It was found that 99% of the uranium had been reduced to uranium dioxide. The resulting product contained 100 p.p.m. fluoride.

*Example 6*

The previous example was repeated except as follows: ammonium diuranate was heated in an atmosphere of steam and hydrogen at 700° C. for 4 hours and heating was then continued for an additional 2 hours in an atmosphere of hydrogen alone to obtain uranium dioxide. It was found that 96% of the uranium had been reduced to uranium dioxide. The resulting product contained 120 p.p.m. fluoride.

*Example 7*

Ammonium diuranate was prepared by hydrolyzing uranium hexafluoride with ammonia. The precipitated ammonium diuranate was separated from its mother liquor on a centrifuge but not washed and then dried at 110° C. It then contained approximately 3% ammonium fluoride. This ammonium diuranate was then thermally decomposed for 3 hours at 850° C. in an atmosphere of steam and hydrogen and the resulting black oxide was reduced by heating for 2 hours at 850° C. in an atmosphere of hydrogen. The resulting uranium dioxide had a bulk density of 3½ grams per cc. whereas ammonium diuranate from which the mother liquor was removed by washing gave uranium dioxide having a bulk density of 2 g. or less per cc. The product contained less than 100 p.p.m. fluoride.

In view of the above, it will be seen that the several objects of the invention are achieved and other advantageous results attained.

As various changes could be made in the above methods without departing from the scope of the invention, it is intended that all matter contained in the above description shall be interpreted as illustrative and not in a limiting sense.

We claim:
1. The method of preparing substantially fluoride-free uranium dioxide which comprises thermally decomposing fluoride-containing ammonium diuranate in nickel alloy equipment at a temperature above approximately 400° C. in a current from an external source containing hydrogen and a significant amount of steam until the ammonium diuranate is converted to substantially fluoride-free black oxide of the formula $U_3O_8$, and thereafter heating said black oxide in an atmosphere of hydrogen until it is reduced to substantially fluoride-free uranium dioxide.

2. The method of preparing substantially fluoride-free uranium dioxide which comprises thermally decomposing fluoride-containing ammonium diuranate in nickel alloy equipment at a temperature above approximately 400° C. in a current containing an excess of steam and hydrogen from an external source until the ammonium diuranate is converted to substantially fluoride-free black oxide of the formula $U_3O_8$, and thereafter heating said black oxide in an atmosphere of hydrogen until it is reduced to substantially fluoride-free uranium dioxide.

3. The method of preparing substantially fluoride-free uranium dioxide which comprises thermally decomposing fluoride-containing ammonium diuranate in nickel alloy equipment at a temperature of approximately 850° C. in a current from an external source containing hydrogen and a significant amount of steam until the ammonium diuranate is converted to substantially fluoride-free black oxide of the formula $U_3O_8$, and thereafter heating said black oxide at a temperature of approximately 850° C. in an atmosphere of hydrogen until it is reduced to substantially fluoride-free uranium dioxide.

4. The method of preparing substantially fluoride-free uranium dioxide which comprises thermally decomposing fluoride-containing ammonium diuranate in nickel alloy equipment at a temperature of approximately 850° C. in a current from an external source containing approximately one part by volume of hydrogen to ten parts by volume of steam until the ammonium diuranate is converted to substantially fluoride-free black oxide of the formula $U_3O_8$, and thereafter heating said black oxide at a temperature of approximately 850° C. in an atmosphere of hydrogen until it is reduced to substantially fluoride-free uranium dioxide.

5. The method of preparing substantially fluoride-free uranium dioxide which comprises thermally decomposing fluoride-containing ammonium diuranate in nickel alloy equipment for approximately three hours at a temperature of approximately 850° C. in a current from an external source containing hydrogen and a significant amount of steam to convert the ammonium diuranate to substantially fluoride-free black oxide of the formula $U_3O_8$, and thereafter heating said black oxide for approximately two hours at a temperature of approximately 850° C. in an atmosphere of hydrogen to reduce the black oxide to substantially fluoride-free uranium dioxide.

6. The method of preparing compartively dense substantially fluoride-free uranium dioxide which comprises thermally decomposing ammonium fluoride-containing ammonium diuranate in nickel alloy equipment at a temperature of approximately 850° C. in a current from an external source containing hydrogen and a significant amount of steam until the ammonium diuranate is converted to substantially fluoride-free black oxide of the formula $U_3O_8$, and thereafter heating said black oxide at a temperature of approximately 850° C. in an atmosphere of hydrogen until it is reduced to substantially fluoride-free uranium dioxide.

7. In the method of preparing substantially fluoride-free uranium dioxide, the step of thermally decomposing fluoride-containing ammonium diuranate in nickel alloy equipment at a temperature above approximately 400° C. in a current from an external source containing hydrogen and a significant amount of steam until the ammonium diuranate is converted to substantially fluoride-free black oxide of the formula $U_3O_8$.

8. The method of preparing substantially fluoride-free uranium dioxide which comprises thermally decomposing fluoride-containing ammonium diuranate in nickel alloy equipment at a temperature above approximately 400° C. in a current containing hydrogen from an external source and a significant amount of steam until the residue is substantially fluoride-free, and thereafter heating said residue in an atmosphere of hydrogen until it is reduced to substantially fluoride-free uranium dioxide.

9. The method of preparing substantially fluoride-free uranium dioxide which comprises thermally decomposing fluoride-containing ammonium diuranate in nickel alloy equipment at a temperature of approximately 850° C. in a current containing hydrogen from an external source and a significant amount of steam until the residue is substantially fluoride-free, and thereafter heating said residue in an atmosphere of hydrogen until it is reduced to substantially fluoride-free uranium dioxide.

10. In the method of preparing substantially fluoride-free uranium dioxide, the step of thermally decomposing fluoride-containing ammonium diuranate in nickel alloy equipment at a temperature above approximately 400° C. in a current from an external source containing hydrogen and a significant amount of steam until the ammonium diuranate is converted to substantially fluoride-free uranium oxide.

References Cited in the file of this patent

UNITED STATES PATENTS 2,664,348     Bonilla _____ Dec. 29, 1953

OTHER REFERENCES

Pierle: J. Phip. Chem., 23:547–8, 1919.

Systematic Inorganic Chemistry, by R. M. Caven and G. D. Lander, published by Blackie & Son, Ltd., London, 1932, pages 336, 337.

Katz et al.: The Chemistry of Uranium National Nuclear Energy, Series 1951, published by McGraw-Hill Book Co., Inc., New York, pages 303–308, 319.